United States Patent
Kurtz et al.

(10) Patent No.: US 7,478,562 B2
(45) Date of Patent: Jan. 20, 2009

(54) HIGH TEMPERATURE LC PRESSURE TRANSDUCER AND METHODS FOR MAKING THE SAME

(75) Inventors: Anthony D. Kurtz, Saddle River, NJ (US); Nathaniel J. Wilson, Hawthorne, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 188 days.

(21) Appl. No.: 11/418,653

(22) Filed: May 5, 2006

(65) Prior Publication Data

US 2007/0256501 A1 Nov. 8, 2007

(51) Int. Cl.
*G01B 7/16* (2006.01)
*G01L 1/00* (2006.01)

(52) U.S. Cl. ........................................ 73/780
(58) Field of Classification Search ............... 73/780; 361/277
See application file for complete search history.

(56) References Cited

U.S. PATENT DOCUMENTS

| | | | |
|---|---|---|---|
| 3,995,696 A * | 12/1976 | Kainer et al. ............ 172/7 |
| 5,576,925 A * | 11/1996 | Gorowitz et al. ......... 361/301.2 |
| 6,327,911 B1 | 12/2001 | Kurtz et al. | |
| 6,691,581 B2 | 2/2004 | Kurtz et al. | |
| 6,891,711 B1 | 5/2005 | Kurtz | |
| 6,972,436 B2 * | 12/2005 | Das et al. ............... 257/77 |
| 7,258,018 B2 * | 8/2007 | Kurtz et al. ............. 73/715 |
| 7,307,325 B2 * | 12/2007 | Kurtz et al. ............. 257/417 |

* cited by examiner

*Primary Examiner*—Edward Lefkowitz
*Assistant Examiner*—Octavia Davis
(74) *Attorney, Agent, or Firm*—The Plevy Law Firm

(57) ABSTRACT

A high temperature pressure capacitor is fabricated utilizing two high temperature substrate wafers. The substrates may be silicon carbide (SiC) or aluminum nitride (AlN). The first substrate has a metal conductive plate positioned on a top surface thereof. The top surface and plate are covered with a dielectric layer. The second substrate has a plate accommodating recess on the top surface thereof. Deposited in the recess is a second conductive plate. The first and second wafers are bonded together via the dielectric layer where the first and second plates face each other. Upon application of a force to the first wafer the diaphragm portion of the first wafer deflects causing the first plate to move and thereby varying capacitance. An inductor may be fabricated on a bottom surface of the second wafer to provide an LC circuit whose resonant frequency varies as a function of capacitance and therefore as a function of pressure.

20 Claims, 7 Drawing Sheets

HIGH TEMPERATURE LC PRESSURE TRANSDUCER AND METHODS FOR MAKING THE SAME

FIELD OF THE INVENTION

This invention relates to pressure transducers and more particularly to a high temperature pressure transducer employing an Inductor (L) Capacitor (C) structure and methods of fabricating the same.

BACKGROUND OF THE INVENTION

The prior art includes a wide variety of devices which generally fall into the broad category of pressure transducers. Certain of these transducers exhibit a change in resistance as a function of an applied force or pressure. Another class of pressure transducers employ a variation of capacitance to determine the magnitude of an applied force. These devices operate to vary the capacitance between a movable plate and a stationary plate. The movable plate is a flexible diaphragm which will deflect upon application of a suitable force by an amount proportional to the force. The motion of the plate serves to vary the effective distance between the movable plate and the fixed plate. As is well known, the distance between two parallel plates determines the magnitude of the effective capacitance. In conjunction with such capacitance variation one can also use an inductor and therefore provide an LC circuit whereby the resonant frequency of the circuit changes as a function of capacitance. A particular device according to this principle is depicted in U.S. Pat. No. 6,891,711. This patent issued on May 10, 2005, to A. D. Kurtz, one of the inventors herein, and is assigned to Kulite Semiconductor Products, Inc., the assignee herein. The patent is entitled "Ultra-Miniature High Temperature Capacitive Inductive Pressure Transducer". In that patent the capacitive inductive pressure transducer is fabricated by MEMS techniques. The transducer consists of two separated pieces of silicon which form the plates of the capacitor, one of which plate is micro-machined in such a way as to allow a deflection with pressure. The gap between the two capacitive plates is determined by an extending rim on one of the two plates. The two pieces of silicon are subsequently fusion bonded, leading to a very small gap between the two plates. An inductor is formed on the top surface of one of the pieces of silicon by sputtering metal in a spiral-like fashion on the back side of the non-micro-machined plate. The above noted patent describes in detail a device which essentially is a capacitive inductive transducer. As one can ascertain the device in the above noted patent is fabricated from silicon and has a limited temperature operation because of the component structure of the device. In any event, there are pressure transducers which operate at extremely high temperatures and are fabricated from silicon carbide. See, for example, U.S. Pat. No. 6,691,581 issued on Feb. 17, 2004, entitled "Pressure Transducer Fabricated from Beta Silicon Carbide" by A. D. Kurtz et al and assigned to the assignee herein. That patent shows a method of fabricating a dielectrically isolated silicon carbide high temperature transducer, which is capable of operating at temperatures above 600° C. See also, U.S. Pat. No. 6,327,911 issued on Dec. 11, 2001 entitled "High Temperature Pressure Transducer Fabricated From Beta Silicon Carbide" issued on Dec. 11, 2001 to A. D. Kurtz et al and assigned to the assignee herein. That patent shows a high temperature pressure transducer which employs silicon carbide as a sensing element or sensor which sensors are situated on a diaphragm also fabricated from silicon carbide. The dielectrically isolated pressure sensing elements are formed on the diagram by a method which employs two separately fabricated wafers that are later bonded together. As one can ascertain the above noted patents depict pressure transducers which are fabricated from beta silicon carbide and which operate at extremely high temperatures. The reason for replacing the silicon as used in U.S. Pat. No. 6,891,711 with silicon carbide or aluminum nitride is to permit the operation of the pressure transducer at significantly higher temperatures. At approximately 600° to 700° C. silicon deforms plastically under high stresses, thus rendering such devices inoperable. For silicon carbide and aluminum nitride the temperatures at which deformation will occur is in excess of 1500° C.

Thus, there is described a method for fabricating an LC circuit utilizing silicon carbide and therefore enabling the device to operate at extremely high temperatures.

SUMMARY OF THE INVENTION

A high temperature pressure variable capacitor, comprising: a first high temperature semiconductor wafer having a top and bottom surface and having a first conductive capacitor plate positioned on the top surface; the first wafer is of a thickness to deflect upon application of a force to the bottom surface; a dielectric layer covering the top surface and the plate, a second high temperature semiconductor wafer having a top and bottom surface and having a plate accommodating depression to form a gap on the top surface, a second conductive plate is located in the depression and relatively congruent to the first plate, the top surface of the first wafer is bonded to the top surface of the second wafer, with the second plate facing the first plate and separated therefrom by the gap, whereby when a force is applied to the bottom surface of the first wafer the diaphragm deflects to change the spacing between the plates and therefore to change the capacitance. An inductor is formed on the second plate and connected to the capacitor to provide an LC circuit.

DETAILED DESCRIPTION OF THE INVENTION

Figure 1A:
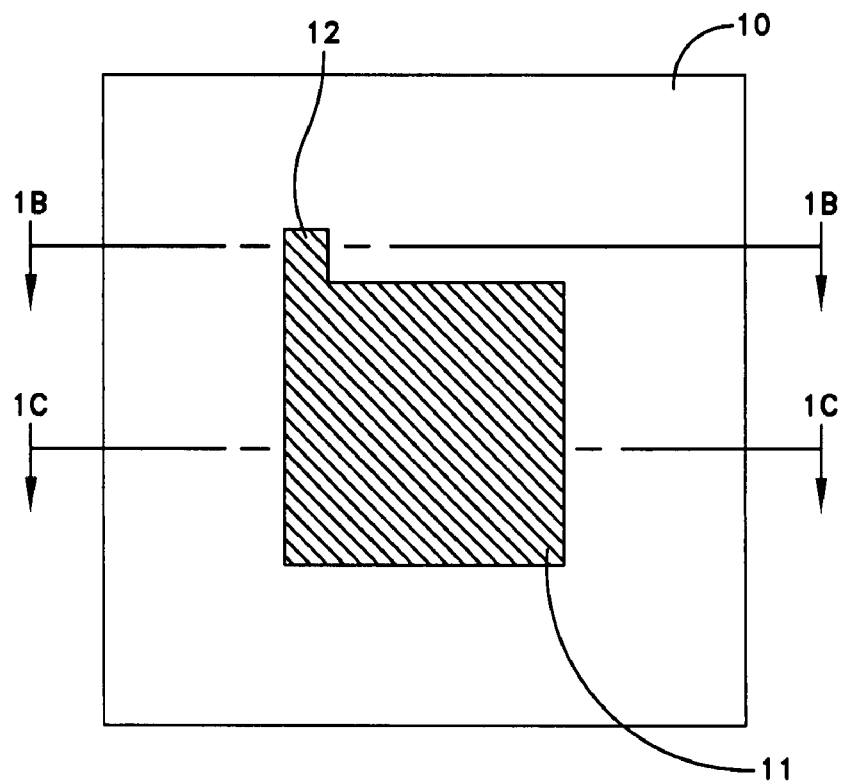
FIG. 1 consists of FIGS. 1A, 1B and 1C show a diaphragm substrate fabrication which includes the steps of depositing and patterning a metal plate and tab according to principles of the present invention.
Figure 1B:
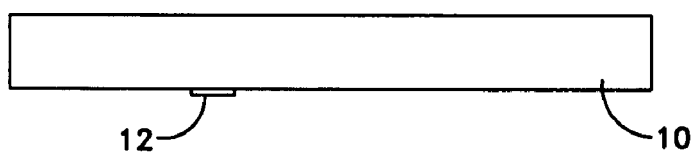
Figure 1C:
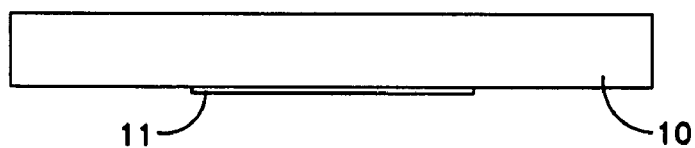

FIG. 1A depicts the first step in the process of forming an LC pressure transducer according to an aspect of the invention. Referring to FIG. 1A, there is shown a diaphragm wafer or substrate 10. The diaphragm wafer 10 can consist of silicon carbide (SiC) or aluminum nitride (AlN). On the top surface of the wafer 10 there is deposited a thin layer of conductive material such as highly doped 3C silicon carbide or metal. The silicon carbide forming the plate may be a layer of high conductively silicon carbide such as N type 3C SiC. The N concentration should be in excess of $10^{18}$ carriers/centimeter. Alternatively the high conductivity layer could be substituted with a metal capable of withstanding high temperatures. The metal may be nickel, platinum, gold or combinations thereof. As can be seen from FIG. 1A the conductive material forms a square portion 11 with a top extending tab or contact area 12. The conductive layer is patterned using photo-lithography and then etched to form a conductive plate 11 and contact area 12. Referring to FIG. 1B there is shown a cross-sectional view taken through line BB of Figure of 1A. As seen in FIG. 1B the wafer 10 and the contact area 12 are depicted. The contact area 12 extends from the wafer. FIG. 1C shows a cross-section taken through line CC of FIG. 1A which shows the wafer 10 and the plate area 11. While the wafer is shown as square and the conductive or plate area 11 is also square, other geometric configurations can be employed as well. The term wafer is used and is synonymous with substrate or layer as used herein. The conductive layer 11 as indicated is patterned and then etched to form a conductive plate and contact area. Etching is done either with wet chemical or electrochemical etch or using a dry etching technique such as a reactive ion etching (RIE). After the conductive layer 11 and contact area 12 is patterned, a dielectric film is then deposited over the entire surface.

Figure 2A:
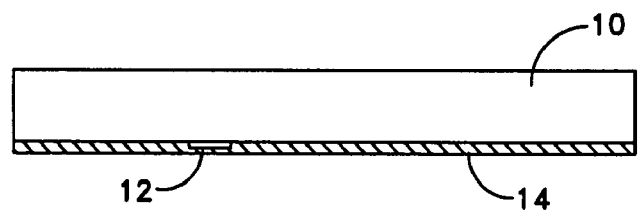
FIGS. 2A and 2B depict a substrate fabrication where the step of depositing and planarizing a dielectric layer on the metal plate of FIG. 1 is depicted.
Figure 2B:
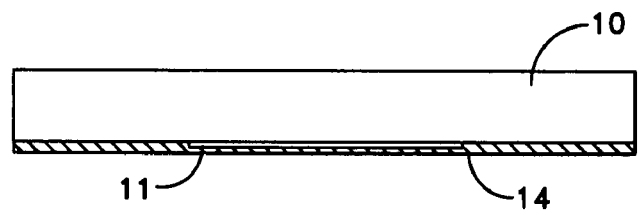

Referring to FIG. 2A there is shown the dielectric film 14 covering the contact area 12 while FIG. 2B shows the same dielectric layer 14 covering the plate area 11. The dielectric layer 14 may be planarized using a polishing technique such as chemical mechanical polishing (CMP). The dielectric film and the deposition of the same is well known in the art. The dielectric film can be silicon dioxide ($SiO_2$) or a similar insulating layer.

Figure 3A:
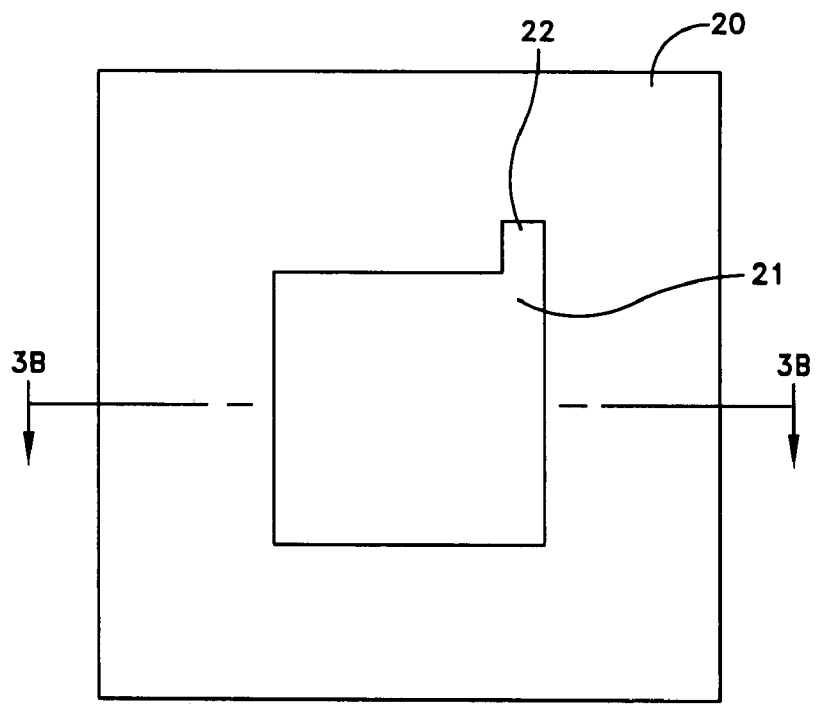
FIG. 3 consists of FIGS. 3A and 3B which shows a substrate fabrication of an additional wafer which is to be fusion bonded to the wafer shown in FIGS. 1 and 2.
Figure 3B:
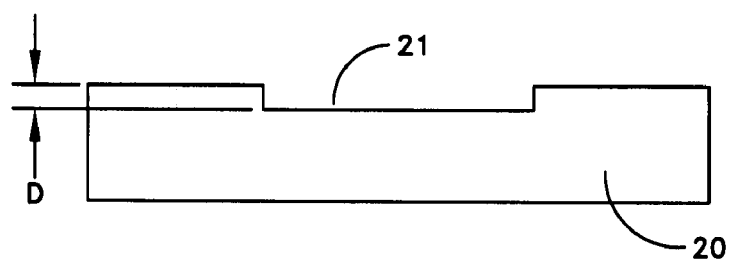

Referring to FIG. 3A, there is shown another wafer 20 which is formed of silicon carbide which has a very low dopant concentration resulting in a high resistivity. The wafer can be single crystal or can be grown. The wafer 20 can also be aluminum nitride which has an inherently high resistivity. As seen in FIG. 3A a shallow channel or depression 21 is etched into the low dopant silicon carbide wafer 20. The channel consists of a plate area 21 and a contact area 22. As seen in FIG. 3B the cavity 21 is relatively shallow as compared, for example to the width of the wafer 20 and essentially has the mirror image pattern of the plate area as depicted for example in FIG. 1A. The cavity 21 is etched using either a wet electrochemical process or a dry etch process such as RIE. The depth of the cavity defines the initial gap between the capacitive plates. As shown in FIG. 3B, the depth of the cavity 21 designated by the letter D represents the gap between the capacitive plates as will be described. The etched cavity 21 as indicated is shaped such that a capacitive plate is formed along with a contact-tab. As one can see, the plate and contact pattern depicted in 3A corresponds to the pattern depicted on the wafer 10 of FIG. 1A.

Figure 4A:
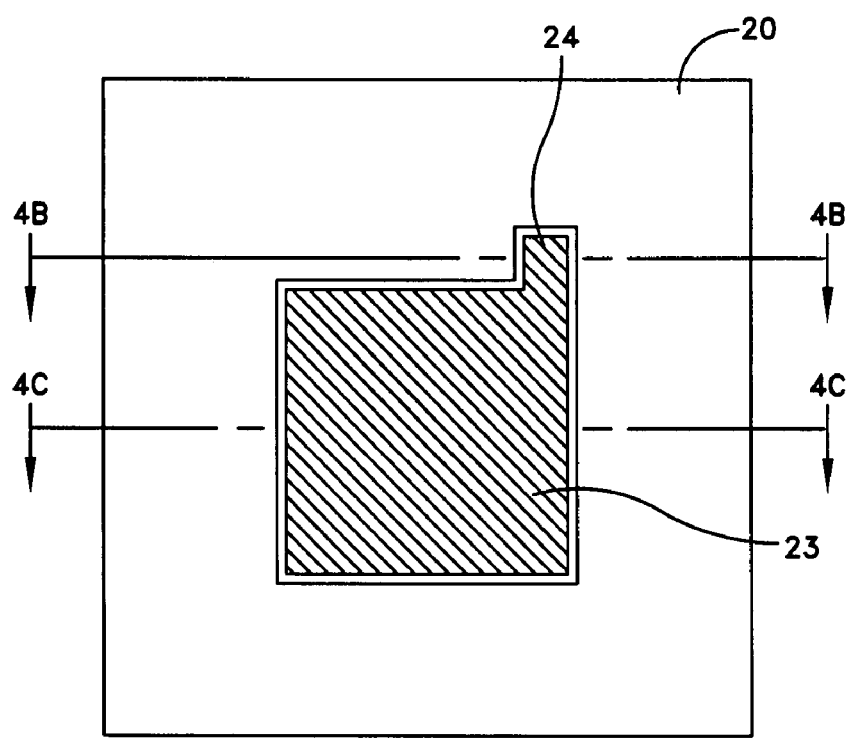
FIG. 4 consists of FIGS. 4A, 4B and 4C which shows a metal deposition for a capacitive plate on the wafer depicted in FIG. 3.
Figure 4B:
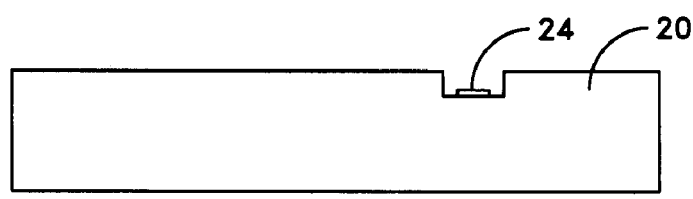
Figure 4C:
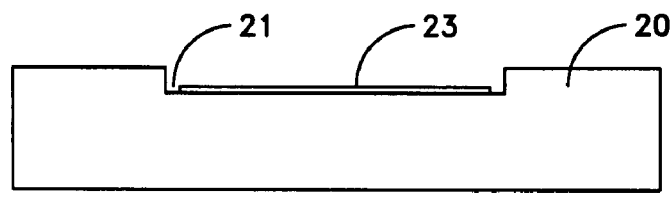

Referring to FIG. 4A, there is shown a top view of the wafer depicted in FIG. 3A. As seen in FIG. 4A a thin layer of metal is deposited within the cavity 21. The areas 23 and 24 may be N type 3C SiC as indicated above or a metal as nickel, gold or platinum. The thin layer 23 acts as a second plate area while area 24 of the metallized area acts as a contact area. FIGS. 4B and 4C are cross-sectional views which depict the deposited contact area 24 as well as the deposited plate area 23. It is also understood that a very thin layer of dielectric can be deposited over the metallized areas 23 and 24. The dielectric layer (if used) must be thin so that the cavity must remain to provide a gap between the two conductive surfaces. Thus as indicated FIGS. 1 and 2 depict the first wafer, while FIGS. 3 and 4 depict the second wafer. As seen one plate as 23 is on wafer 20 while the other plate of the capacitor as plate 11 is on the corresponding wafer 10.

Figure 5A:
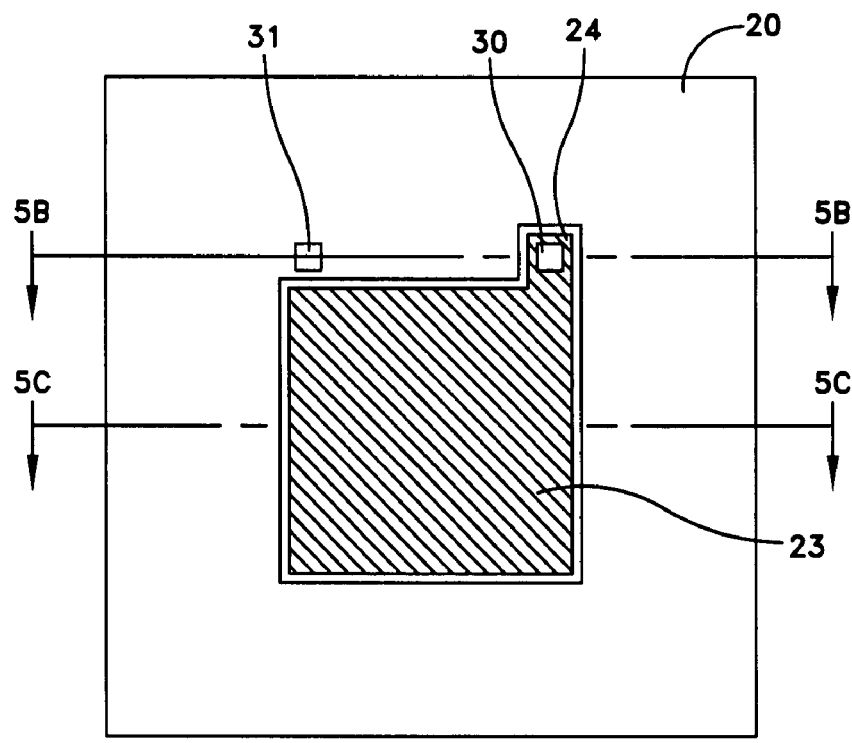
FIG. 5 consists of FIGS. 5A, 5B and 5C which depict the fabrication of contact apertures associated with the capacitive structure according to this invention.
Figure 5B:
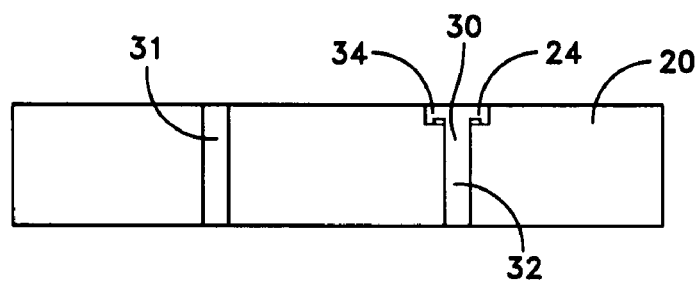
Figure 5C:
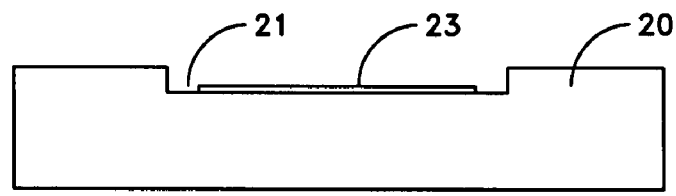

Referring to FIG. 5, there is shown the fabrication of through holes 31 and 30. As seen the through hole, or aperture 31 is formed on the wafer 20 and goes from the top surface of the wafer to the bottom. Aperture 30 is formed within the contact area 24. As seen in FIG. 5B, the aperture 30 has a larger top opening 34, which extends into a narrower aperture portion 32. The top larger opening 34 is necessary as will be explained. The exact nature of apertures 30 and 31 are shown in FIG. 5B in the cross-section. FIG. 5C again depicts the wafer 20 with the metallized plate area 23 located within depression 21. The holes, or contact apertures 30 and 31 are formed using a dry or wet etching process or a mechanical drilling process. Essentially the processes employed above are all known in the art and one skilled in the art would be aware of such processes. After the two plates are formed on wafers 10 and 20 the wafers are bonded together as shown in FIG. 6.

Figure 6A:
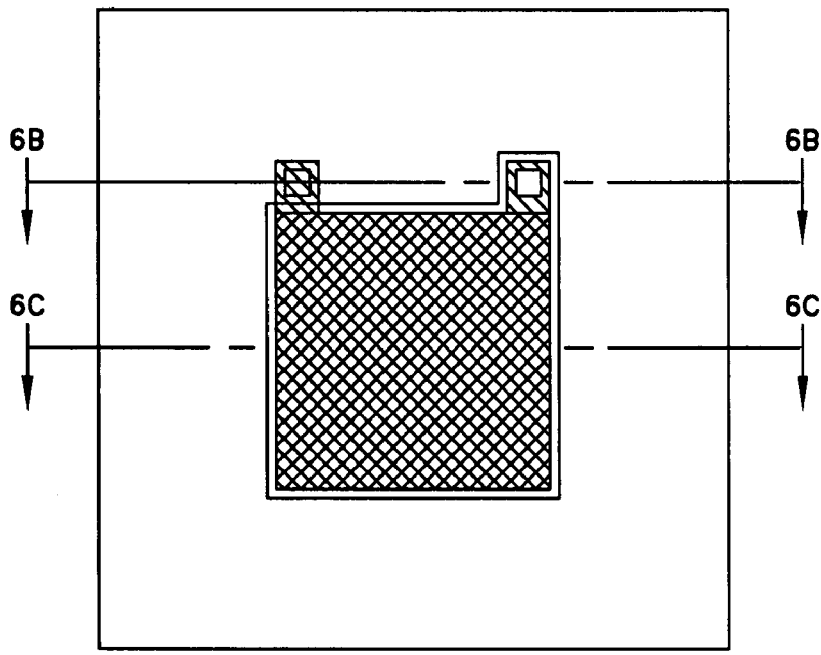
FIG. 6 consists of FIGS. 6A, 6B and 6C and shows the bonding of the substrates of FIG. 1 and FIG. 3 according to this invention.
Figure 6B:
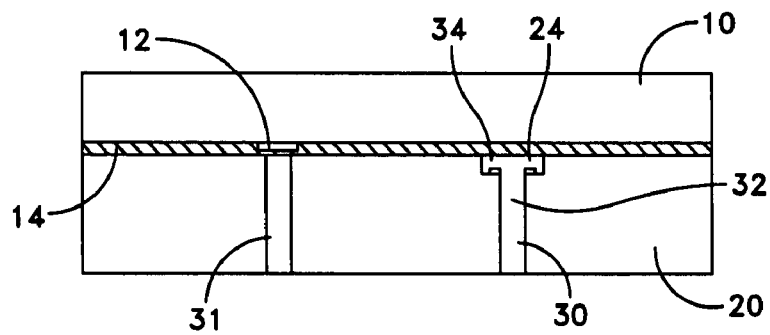
Figure 6C:
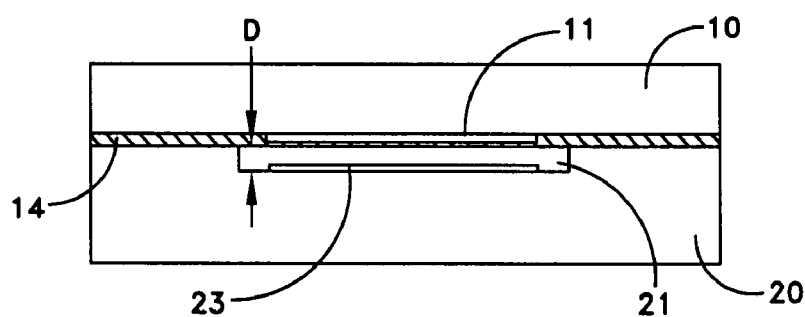

FIG. 6A depicts the two wafers bonded together and superimposed upon each other. The figure shows the plates in solid line format. The central area shows the two plates with the cross-hatching indicative of plate 23 on wafer 20 and plate 11 on wafer 10. The lines are solid as to be drawn in dashed lines would be difficult. In any event, as one can see, from FIG. 6B, the wafer 10 is bonded to wafer 20. FIG. 6B shows the cross-sectional view taken through line BB of FIG. 6A, while FIG. 6C shows the section view taken through line CC of FIG. 6A. As one can ascertain then, there is shown in FIG. 6C the plates 11 and 23 separated by the depth of the cavity 21 wherein plate 11 and 23 form the capacitor. The two wafers 10 and 20 are bonded together utilizing the above described dielectric film 14. The film as indicated is composed of silicon dioxide or a similar layer. This material promotes bonding and acts as a dielectric insulation between the two plates. As one can see, from FIG. 6C the dielectric layer 14 acts as a dielectric insulator for the two plates 11 and 21. Bonding utilizing the dielectric layer 14 is known and as can be implemented using an electrostatic bonding technique or otherwise placing the two wafers together under pressure and heat and so on. As seen in FIG. 6C there is now shown a composite structure where wafers 10 and 20 are bonded together. FIG. 6B shows the wafers again bonded together, but also shows the contact apertures 31 and 34. This forms a capacitor.

Figure 7A:
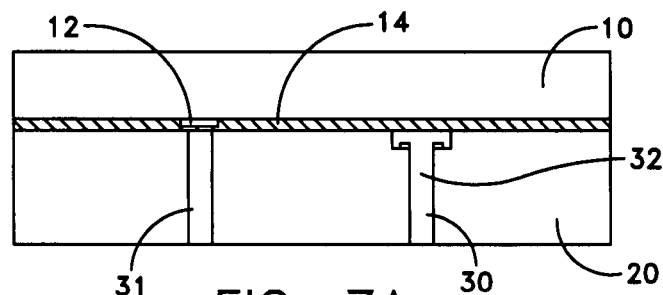
FIG. 7 consists of FIGS. 7A and 7B and shows the patterning and the etching of the diaphragm according to this invention to produce a capacitive pressure transducer.
Figure 7B:
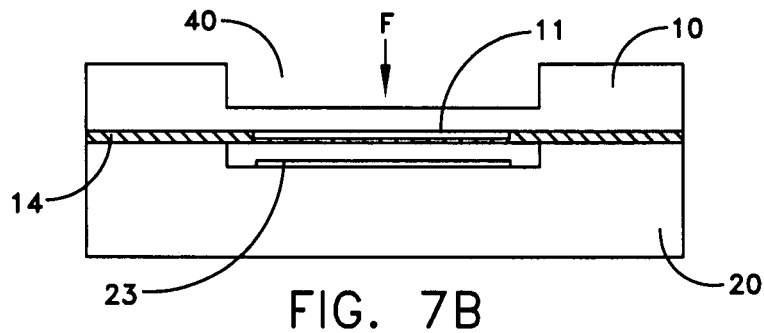

Referring to FIG. 7A, there is shown again the wafers 10 and 20 bonded together. FIG. 7B shows that there is a diaphragm depression 40 etched in wafer 10. This constitutes the deflection or diaphragm area of the capacitor. The wafer 10 is etched so that the diaphragm with the conductive plate 11 will deflect towards the opposite conductive plate 23 in response to a pressure or force F applied to the surface of the wafer 10 (FIG. 7B). Various pressure ranges and sensitivity capabilities can be achieved by varying the diaphragm thickness. The etching process used to form the diaphragm portion by etching depression 40 is done in the same manner as described in previous Kulite patents. See for example U.S. Pat. No. 6,327,911 as indicated above and U.S. Pat. No. 6,691,581 as indicated above. Both of these patents are incorporated herein by reference and in their entirety. The above noted patents explain etching techniques of SiC as well as various other processing techniques which are applicable and utilized in providing the structure depicted herein.

Figure 8A:
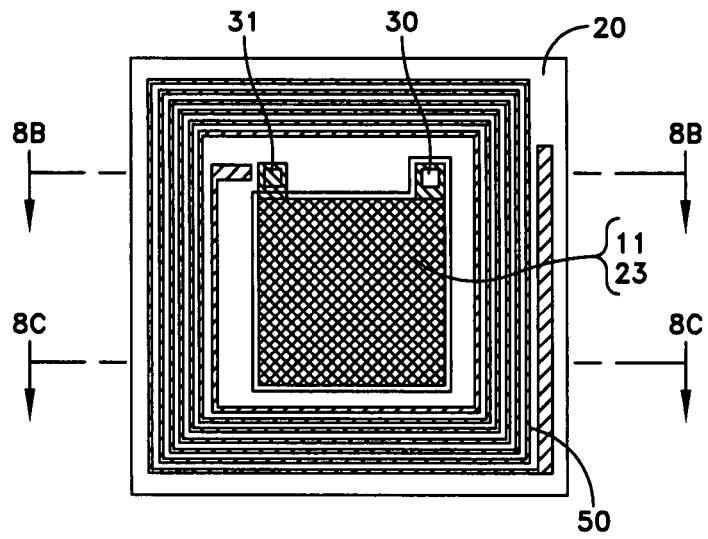
FIG. 8 consists of FIGS. 8A, 8B and 8C and shows the wafer fabrication step which includes forming an inductive pattern by etching inductor grooves and then filling the inductor grooves and contact holes with a conductive paste.
Figure 8B:
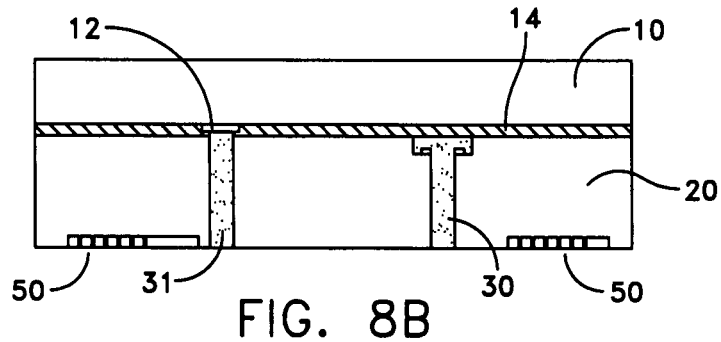
Figure 8C:
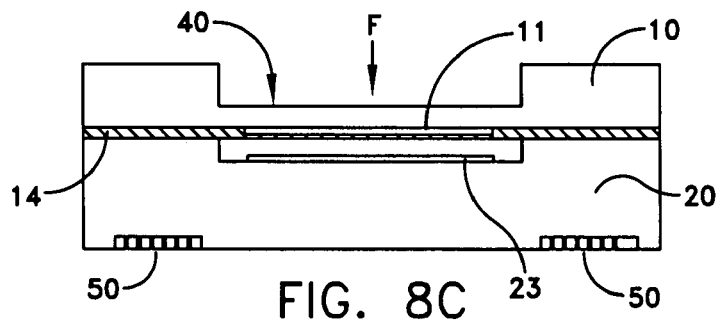

Referring to FIG. 8A, there is shown a top plan view of the pressure transducer under construction. In FIG. 8A the plates 11 and 23 are superimposed, one on top of the other as evidenced by the cross-hatching depicted. As one can ascertain, the cross-hatching on plate 11 is of a negative slope with a cross-hatching of plate 23 of a positive slope. It is of course again understood that the view of FIG. 8A is looking through the bottom wafer 20. On the top surface of the bottom wafer 20 there is located an inductor 50. The inductor 50 is fabricated by first etching a spiral-like groove which is formed on the surface of the wafer 20. A conductive metal is deposited in the groove as shown for example in FIGS. 8B and 8C which are the cross-sectional views taken through lines BB and CC of FIG. 8A. The groove is etched into the surface of the wafer and then filled with a metal. This thus forms a metal spiral which basically functions as the inductor. Interconnects between the capacitive plates 11 and 23 and the inductor 50 are made through holes which are formed through the various portions of the two silicon carbide structures and with contact being made to the contact areas in the capacitor plates and/or the inductor area using high temperature glass metal frits such as a glass platinum frit. Alternatively, the inductor could be located on the side adjacent to the capacitor structure. The deposition of metal to form inductors is well known. It is also seen in FIGS. 8B and 8C that the contact apertures 30 and 31 are filled with a glass frit containing metal particles. Thus contact 31 is in direct contact with the bottom plate of the capacitor while contact 30 is in contact with the top plate of the capacitor. The capacitor as is known can be connected either in parallel or in series with the inductor by making the appropriate circuit connections. As indicated above, and one can understand, fabrication of the device includes the following steps that define the basic process. It is also understood that these steps may vary in detail and the order in which they are performed. The diaphragm wafer initially consists of silicon carbide or aluminum nitride with a thin layer of conductive material such as highly doped 3C silicon carbide or metal forming a plate. The metal may be gold, nickel, platinum or other conductive metal. This conductive layer is formed using photolithography and etched to form a conductive plate and contact area as for example shown in FIG. 1. Etching is done either with wet chemical or electrochemical etch or using a dry etching technique such as reactive ion etching (RIE). After the conductive layer is patterned a dielectric film is deposited over the entire surface and if necessary the film is planarized using a polishing technique such as chemical mechanical polishing. This step is shown in FIG. 2. Another initial structure and device is also formed of silicon carbide of a very low dopant concentration resulting in high resistivity. In a similar manner, this other structure can be fabricated from aluminum nitride which has an inherently high resistivity. As seen in this structure a relatively shallow cavity is etched as cavity 21 shown in FIG. 3B. This etched cavity 21 is shaped such that a capacitive plate is formed along with an appropriate contact tab as shown in FIGS. 3 and 4. The plate formed on wafer 20 is similar to the plate formed on the wafer 11. A metal layer is patterned and deposited in the cavity and serves as the opposite capacitor plate to the one formed on the diaphragm plate. This is shown in FIG. 4. The patterning can be done as per the metal patterning techniques mentioned above. After patterning a relatively thin layer of dielectric may be deposited over the conductive surface, although the cavity must remain so that there is an unfilled gap between the two surfaces. The dielectric on the surfaces is used as a capacitive dielectric. It is also known that the air space between the plates also operates as a dielectric and hence the variable distance between the plates results in a different capacitance. As one can see, the diaphragm plate which is on wafer 10 upon application of a force or pressure thereto will deflect causing plate 11 to move closer to plate 23 thereby changing the capacitance. Electric contact is made to each of the two conductive plates such as 11 and 23 using holes formed through the structural plate as shown for example in FIG. 5. Those are machined using a dry or wet etching process or mechanical drilling process. These techniques are well known and commonly employed. After the two plates 11 and 23 are prepared, the wafers are bonded together using the dielectric layer as an interface. This is shown in FIG. 6. The above described dielectric film being composed of a silicon dioxide promotes bonding and acts as a dielectric insulation between the two plates. After the two substrates or wafers are bonded electrical contact is made by filling the holes with a conductive frit as a metal paste as seen and described in the above noted patents. The final step in fabricating the pressure sensitive capacitor structure is to etch the diaphragm wafer so that the attached conductive plate will deflect toward the opposite conductive plate in response to pressure. This is shown in FIG. 7. Various pressure range and sensitivity capabilities can be achieved by varying the diaphragm thickness. This etching process to form the diaphragm is done in the same manner as described in the above noted patents and one may use either wet or dry etching techniques or a combination of both as described. The inductor is formed on the substrate wafer by etching into the substrate a spiral-like groove in the shape desired for the inductor. Again, using either wet or dry etching techniques. This groove is then filled with a highly conductive metal material. This is shown in FIG. 8. The material can be nickel, gold, or platinum for high temperature and frequency operation. Alternatively, the metal may be deposited and patterned onto the surface of the plate without etching grooves. This can be accomplished by vapor deposition using photolithographic techniques. A second alternative is to fabricate the inductor on a separate structure which would be a different wafer and then connect the inductor to the capacitor.

It is understood that the capacitor structure alone is a variable pressure sensing device, as the capacitance changes with diaphragm deflection, which deflection is proportional to an applied force or pressure. Another alternative fabrication scheme is basically the same of the above, but the scheme utilizes silicon carbide epilayer on a silicon substrate as the diaphragm wafer. This is shown in FIG. 9.

Figure 9A:
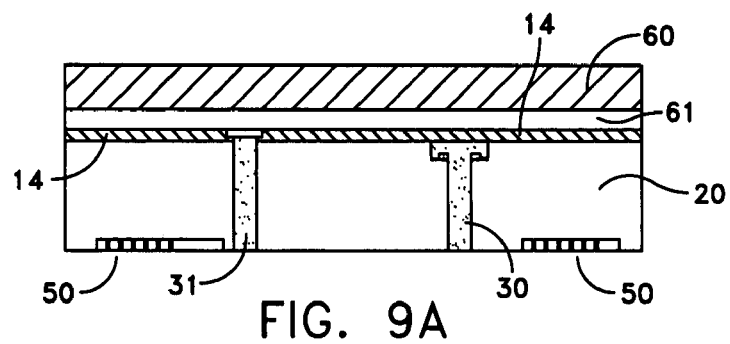
FIG. 9 consists of FIGS. 9A and 9B and shows a composite wafer construction where an alternative wafer is used employing silicon having an epilayer of silicon carbide on a surface.
Figure 9B:
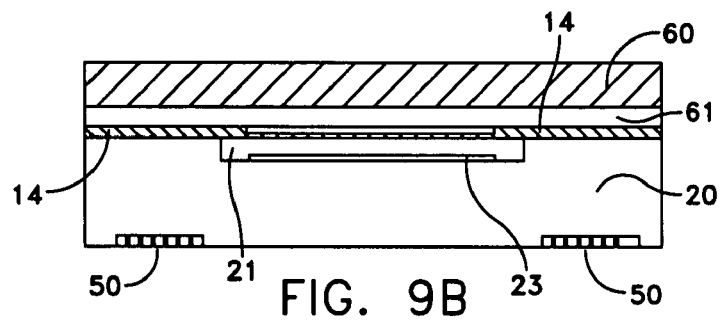

Referring to FIG. 9A there is shown an alternative structure which basically appears as the structure depicted in FIGS. 8A and 8B. In any event, the structure in FIG. 9A includes a different wafer in lieu of wafer 10. The wafer shown in FIG. 9A is a silicon wafer 60 having a silicon carbide epilayer 61 grown thereon. The use of silicon 60 to grow silicon carbide on the surface thereof is well known. In any event, the silicon wafer 60 with the top layer or epilayer of silicon carbide is now bonded to wafer 20 via the silicon dioxide layer 14. As shown in FIG. 9B the wafer 20 which contains the plate 23 and inductor 50 is bonded to the silicon wafer 60 via the epilayer 61.

Figure 10A:
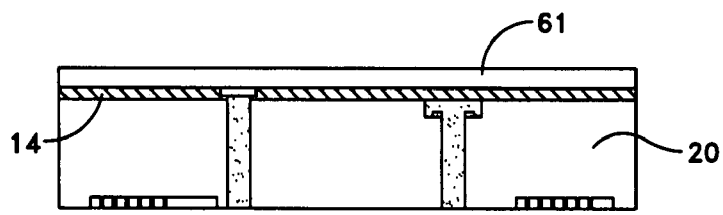
FIG. 10 consists of FIGS. 10A and 10B which shows the wafer of FIG. 9 after sacrificial etching whereby the layer of silicon is removed to form an alternate pressure transducer according to this invention.
Figure 10B:
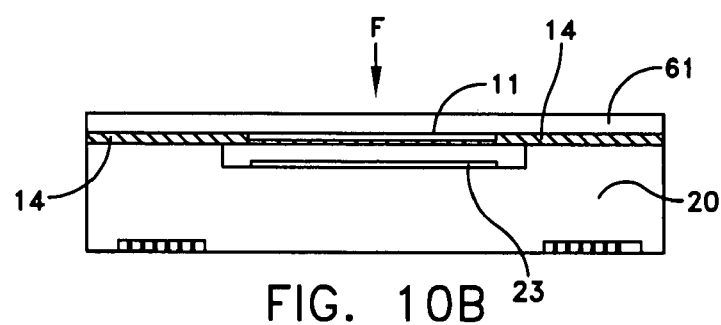

Referring to FIG. 10A it is seen that the silicon layer 60 is now removed or etched away leaving the silicon carbide epilayer 61 bonded to wafer 20 via the layer of silicon dioxide 14. The wafer 61 is extremely thin and therefore acts as a diaphragm. When a force (FIG. 10B) is impressed upon the top surface of the layer 61 the layer will deflect causing the plate 11 to move towards plate 23 thus varying the capacitance. The etching away of silicon is well known and it can be sacrificially etched during bonding leaving the silicon carbide epilayer 61. The layer 61 does not etch in wet silicon etchants such as KOH. Thus, the final structure contains only silicon carbide or high temperature materials (FIG. 10B). The diaphragm thickness again is determined by the initial thickness of the silicon carbide epilayer 61. This layer can also be thinned by silicon carbide etching techniques if desired. As indicated above the techniques employed herein are known in prior art. See for example U.S. Pat. No. 6,691,581 and U.S. Pat. No. 6,327,911. These patents show various techniques for working with silicon carbide including the etching and the deposition of metals and so on. All these techniques are employed and can be employed in the above noted application and structure. Thus, variation and modifications should be apparent to those skilled in the art and all such variations and modifications are deemed to be incorporated herein.

What is claimed is:

1. A high temperature pressure variable capacitor, comprising:
    a first high temperature semiconductor wafer having a top and bottom surface and having a first conductive capacitor plate positioned on the top surface, said first wafer of a thickness enabling deflection upon application of a force to said bottom surface thus acting as a diaphragm;
    a dielectric layer covering said top surface and said plate;
    a second high temperature semiconductor wafer having atop and bottom surface and having a plate-accommodating depression etched into the top surface to a given depth, a second conductive plate located in said depression and relatively congruent to said first plate, said top surface of said first wafer bonded to said top surface of said second wafer, with said second plate facing said first plate and separated therefrom by a gap, said gap forming a capacitor between said first and second plates, whereby when a force is applied to the bottom surface of said first wafer said diaphragm deflects to change the gap between said plates and a capacitance between said first and second plates.

2. The high temperature capacitor according to claim 1, wherein said first wafer is fabricated from silicon carbide (SiC) and wherein said bottom surface has a depression underlying said plate to provide a thinner area for said plate to enable deflection.

3. The high temperature capacitor according to claim 1, wherein said first wafer is fabricated from aluminum nitride (AIN).

4. The high temperature capacitor according to claim 1, wherein said first conductive plate is fabricated from highly doped 3C silicon carbide.

5. The high temperature capacitor according to claim 1, wherein said first conductive plate is fabricated from a metal selected from nickel, platinum or gold.

6. The high temperature capacitor according to claim 1, wherein said second wafer is fabricated from a low silicon carbide having a high resistivity.

7. The high temperature capacitor according to claim 1, wherein said second wafer is fabricated from aluminum nitride (AIN).

8. The high temperature capacitor according to claim 1, wherein said second plate is fabricated from a high conductivity layer of 3C SiC.

9. The high temperature capacitor according to claim 1, wherein said second plate is fabricated from a metal selected from nickel, platinum or gold.

10. The high temperature capacitor according to claim 1, wherein said dielectric layer is silicon dioxide.

11. The high temperature capacitor according to claim 1, wherein said first wafer is a thin epilayer of silicon carbide of a thickness to act as said deflecting diaphragm.

12. The high temperature capacitor according to claim 1, wherein said second wafer has at least one contact aperture directed from said bottom to said top surface to enable contact to be made to one of said plates.

13. The high temperature capacitor according to claim 1, further including a metallic spiral inductor mounted on the bottom surface of said second wafer and operative to resonant with said capacitor to provide a resonant frequency that varies according to said force applied to said first wafer.

14. The high temperature capacitor according to claim 13, wherein said metallic spiral is located in a spiral groove formed on the bottom surface of said second wafer.

15. A method of fabricating a pressure variable capacitor, comprising the steps of:
    forming a first capacitor plate on a top surface of a first high temperature substrate, coating said top surface of said first substrate with a layer of dielectric,
    forming a capacitor plate-accommodating recess within a top surface of a second high temperature substrate,
    forming a second capacitor plate in said recess,
    bonding said first substrate to said second substrate1 at said top surfaces, employing said dielectric layer as a bonding agent to cause said first plate to overlie said second plate with a gap therebetween, said gap forming a capacitor between said first and second plates and varying as a force is applied to the bottom surface of said first wafer to cause a variance in a capacitance of said capacitor according to the varying gap.

16. The method according to claim 15, wherein said first substrate is silicon carbide with a conductive plate deposited on said top surface said plate having 3C silicon carbide of N type having a concentration in excess of $10^{18}$ carriers/centimeter.

17. The method according to claim 15, wherein said first substrate is selected from silicon carbide or aluminum nitride having a conductive plate deposited on said top surface said plate being a metal selected from nickel, platinum or gold.

18. The method according to claim 15, wherein said first substrate is an epilayer of silicon carbide.

19. The method according to claim 15, wherein said second substrate is selected from SiC or AIN.

20. The method according to claim 15, further forming a conductive spiral inductor on the bottom surface of said second substrate to provide an LC network where the resonant frequency varies according to the variation in capacitance.

* * * * *